United States Patent
Guo et al.

(10) Patent No.: US 12,311,424 B2
(45) Date of Patent: May 27, 2025

(54) METHOD FOR PRECISION FORMING BY CONTINUOUS FREE BENDING

(71) Applicant: Nanjing University of Aeronautics and Astronautics, Nanjing (CN)

(72) Inventors: Xunzhong Guo, Nanjing (CN); Jie Tao, Nanjing (CN); Cheng Cheng, Nanjing (CN); Chunmei Liu, Nanjing (CN); Hui Wang, Nanjing (CN); Wenbin Wei, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 510 days.

(21) Appl. No.: 17/766,190

(22) PCT Filed: Jan. 7, 2020

(86) PCT No.: PCT/CN2020/070618
§ 371 (c)(1),
(2) Date: Apr. 1, 2022

(87) PCT Pub. No.: WO2021/103290
PCT Pub. Date: Jun. 3, 2021

(65) Prior Publication Data
US 2022/0379362 A1 Dec. 1, 2022

(30) Foreign Application Priority Data

Nov. 28, 2019 (CN) .......................... 201911195911.3

(51) Int. Cl.
*G05B 13/04* (2006.01)
*B21D 11/02* (2006.01)

(52) U.S. Cl.
CPC .............. *B21D 11/02* (2013.01); *G05B 13/04* (2013.01)

(58) Field of Classification Search
CPC .......... B21D 11/02; B21D 7/085; B21D 7/12; B21D 11/00; G05B 13/04
See application file for complete search history.

(56) References Cited

U.S. PATENT DOCUMENTS

2007/0223121 A1 * 9/2007 Franck .............. B32B 17/10889
359/826

FOREIGN PATENT DOCUMENTS

CN 108746283 A * 11/2018
JP H1177173 A * 3/1999

* cited by examiner

*Primary Examiner* — Yuhui R Pan
(74) *Attorney, Agent, or Firm* — EVAN LAW GROUP LLC

(57) ABSTRACT

A method for precision forming by continuous free bending starts with establishing a correlation equation of a continuous axis f(x) to a bending radius R and determining a bending radius R at a real-time location in the axis. Based on the free bending technique, the method further involves establishing a correlation model of a real-time bending radius R of a tube to an eccentric distance U of a bending die and hence correlations of the equation of the axis to free bending parameters, and constructing a complete correlation model among f(x), R, U, and t based on a relational equation of an eccentric distance U to movement time t of the bending die to enable the precision forming of a complex component by continuous bending. Accordingly, the production efficiency can be improved.

5 Claims, 3 Drawing Sheets

METHOD FOR PRECISION FORMING BY CONTINUOUS FREE BENDING

CROSS REFERENCE TO RELATED APPLICATION

This patent application claims the benefit and priority of Chinese Patent Application No. 201911195911.3, filed on Nov. 28, 2019, the disclosure of which is incorporated by reference herein in its entirety as part of the present application.

TECHNICAL FIELD

The present disclosure relates to a flexible manufacturing method for a metal component, and in particular, to a method for precision forming by continuous free bending.

BACKGROUND

Complex bent components have been extensively used and played an important role in the fields of nuclear equipment, aerospace, etc. In an actual forming process, complex axes render the forming more difficult, especially for continuously varying curvature complex bent components. Moreover, it is impossible to guarantee the precision of bending forming. During three-dimensional free bending forming of tubes and profiles, materials may have higher degrees of freedom, leading to increased difficulty of precision forming control. For continuous bending of a complex component, the forming precision has a great impact on the forming quality of the component. Accordingly, it is necessary to provide a precision forming method to control the forming precision of complex bent components.

SUMMARY

An objective of the present disclosure is to provide a method for precision forming by continuous free bending.

The following technical solution is adopted: a method for precision forming by continuous free bending provided in the present disclosure includes the following steps:

(1) extracting a curved axis from a bent component, establishing a correlation equation of the continuous curved axis f(x) to a bending radius R, and determining a bending radius R at a real-time location in the curved axis, where when x is specified to be x0 and x1 separately and $x_1 > x_0$, $|x_1 - x_0| > 0$;

(2) establishing a correlation model of a bending radius R to an eccentric distance U of a bending die to obtain correlations of f(x) to bending parameters; and (3) constructing a complete correlation model among f(x), R, U, and t based on a relational equation of an eccentric distance U to movement time t of the bending die to enable the precision forming of the bent component by continuous free bending.

Further, f(x) may be a parabolic axis function.

Further, the correlation equation of f(x) to a bending radius R in step (1) may be expressed as:

$$R_n = \frac{(1 + f(x)'^2)^{\frac{3}{2}}}{|f(x)''|},$$

where n represents a point n in the curved axis, while $R_n$ a bending radius corresponding to the point n.

Further, the correlation model of a bending radius R to an eccentric distance U of a bending die in step (2) may be expressed as:

$$t_{sn} = \frac{\Delta S_n}{v},$$

$$t_{kn} = \frac{\pi \times R_n \times \arcsin\frac{A}{R_n}}{180° \times v};$$

$$U_n = R_n - R_n \cos\frac{vt_{kn} \times 180}{\pi \times R_n} + \tan\frac{vt_{kn} \times 180}{\pi \times R_n}\left(A - R_n \sin\frac{vt_{kn} \times 180}{\pi \times R_n}\right),$$

where $U_n$ represents an eccentric distance corresponding to the point n, while A a distance from a front end of a guide mechanism to the center of the bending die, v an axial feed velocity of a tube, $t_{sn}$ a time taken for forming of an arc length $\Delta S_n$, and $t_{kn}$ a time taken for the bending die to reach an eccentric distance $U_n$.

Further, n may be 6.

According to the present disclosure, the method mainly involves establishing a correlation equation of a continuous axis f(x) to a bending radius R and constructing a correlation model of a real-time bending radius R to an eccentric distance U of a bending die and a correlation model among f(x), R, U, and t. Finally, real-time continuous forming of a tube can be realized by controlling the movement time t of the bending die. This allows technicians to simulate the operation before actual forming production.

The present disclosure has the following beneficial effects: the method makes good use of the advantage, namely realizing bending and single-step flexible forming of a metal component having a complex shape, of a three-dimensional free bending device for components such as tubes. The method can significantly increase the rate of finished products and reduce the cost of adjustment. When used in practical production, the method can effectively improve the forming precision of products and improve the forming quality of curved components without any subsequent correction, thereby raising the production efficiency and reducing the production cost for a manufacturer. The method is simple and feasible with high production efficiency, and is of significant engineering practical value and productive of obvious economic benefits in the engineering fields of aerospace, nuclear power, automobiles, etc.

DETAILED DESCRIPTION

Example 1

Figure 1:
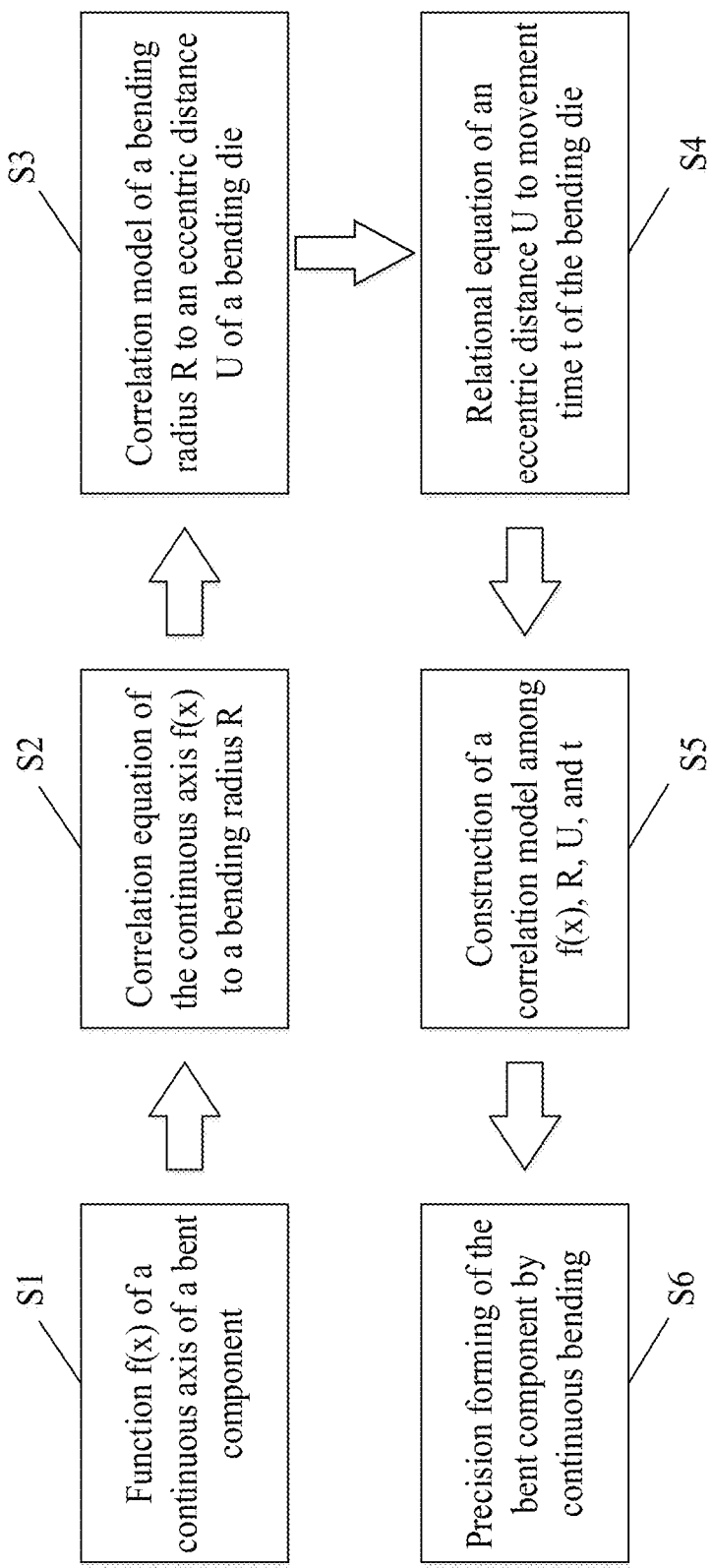
FIG. 1 is a flowchart of a method for precision forming of a tube by continuous free bending.
Figure 2:
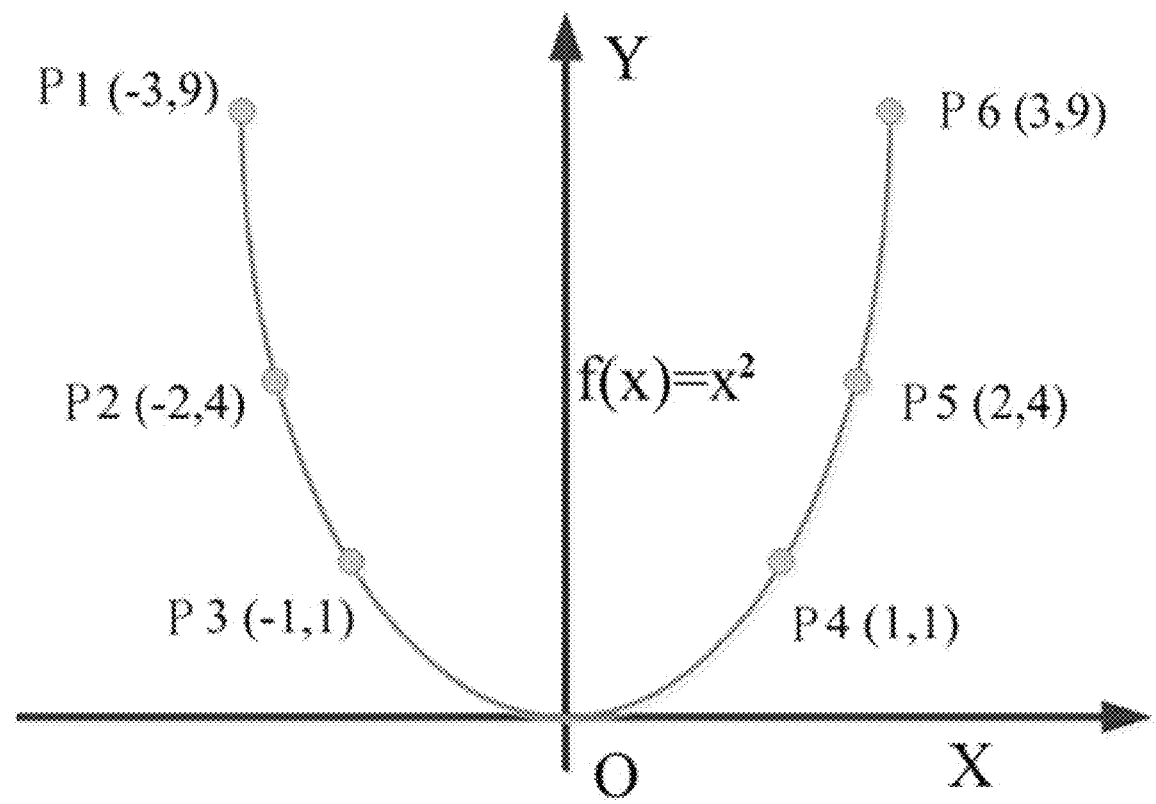
FIG. 2 is a schematic diagram analytically illustrating a parabolic axis of a complex component.
Figure 3:
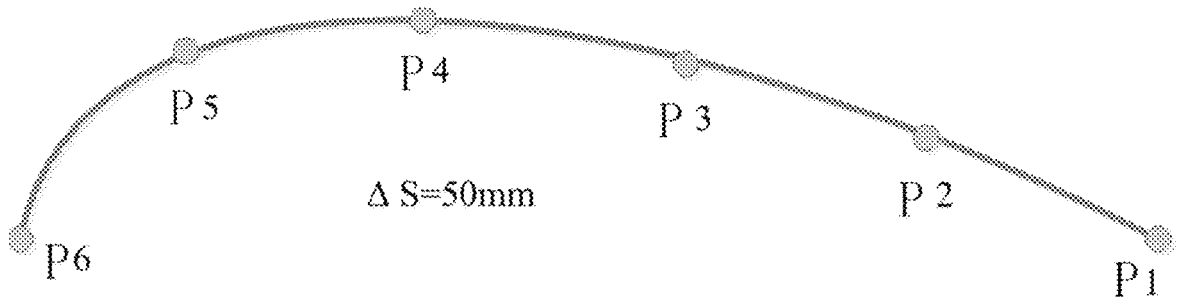
FIG. 3 is a schematic diagram analytically illustrating a custom axis of a complex component.

As shown in FIG. 1 to FIG. 4, a complex bent component having a parabolic axis $f(x)_1 = x^2$ ($-3 \leq x \leq 3$) is taken for example in this Example. The steps S1-S6, as shown in FIG. 1, schematically shows the method for precision forming of a tube by continuous free bending. Firstly, a curved axis is extracted from the complex bent component. In the axis, n points are designated, and each point corresponds to a single bending radius $R_n$, and corresponds to a single eccentric distance $U_n$ and time $t_n$ during free bending. That is, at each time, there is a corresponding eccentric distance present to control the free bending forming of the parabolic component. In this Example, 6 control points are chosen in the parabolic axis. The coordinates of the 6 control points are determined according to the function $f(x)_1=x^2$ to be P1 (−3,9), P2 (−2,4), P3 (−1,1), P4 (1,1), P5 (2,4), and P6 (3,9), and each corresponding bending radius $R_n$ is calculated. An eccentric distance and a movement velocity of a bending die are calculated by analytic equations for the free bending forming process, whereby a movement locus is determined. The free bending die is then allowed to move along the planned locus to form the complex component having a parabolic axis.

$$R_n = \frac{(1+f(x)'^2)^{\frac{3}{2}}}{|f(x)''|}$$

$$t_{sn} = \frac{\Delta S_n}{v},$$

$$t_{kn} = \frac{\pi \times R_n \times \arcsin\frac{A}{R_n}}{180° \times v},$$

$$U_n = R_n - R_n \cos\frac{vt_{kn} \times 180}{\pi \times R_n} + \tan\frac{vt_{kn} \times 180}{\pi \times R_n}\left(A - R_n \sin\frac{vt_{kn} \times 180}{\pi \times R_n}\right)$$

Figure 4:
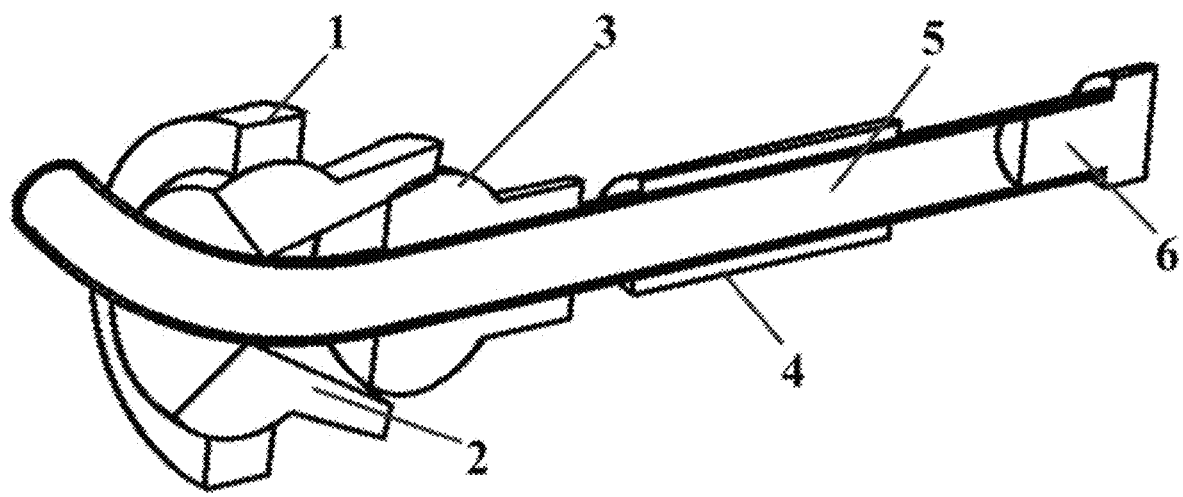
FIG. 4 is a schematic diagram illustrating simulation of three-dimensional free bending of a tube component.

The bending radius of the six points are calculated to be $R_1=1125.3$ mm, $R_2=350.4$ mm, $R_3=55.9$ mm, $R_4=55.9$ mm, $R_5=350.4$ mm, and $R_6=1125.3$ mm, respectively, and the eccentric distances and times are obtained accordingly as follows: $t_{s1}=7.07$ s, $t_{k1}=3.0$ s, $U_1=0.400071131$ mm; $t_{s2}=5.10$ s, $t_{k2}=3.004$ s, $U_2=1.288082569$ mm; $t_{s3}=3.17$ s, $t_{k3}=3.165$ s, $U_3=8.713600553$ mm; $t_{s4}=3.17$ s, $t_{k4}=3.165$ s, $U_4=8.713600553$ mm; $t_{s5}=5.10$ s, $t_{k5}=3.004$ s, $U_5=1.288082569$ mm; and $t_{s6}=7.07$ s, $t_{k6}=3.0$ s, $U_6=0.400071131$ mm. The free bending forming of the parabolic axis is controlled precisely based on the calculated real-time eccentric distances and times. The simulated result is illustrated in FIG. 4, in which a spherical bearing 1, the bending die 2, a guide mechanism 3, a hold-down mechanism 4, a tube 5, and a feed mechanism 6 are shown.

Example 2

A custom continuous curve $f(x)_2$ is taken for example herein. Firstly, a curved axis is extracted from a complex bent component, with a bending radius varies with increasing arc length. In particular, the bending radius will increase or decrease by 20 mm for each increase of 50 mm in arc length. At an initial point of the extracted curve, the bending radius is 260 mm. In the axis, n points are designated, and each point corresponds to a single bending radius $R_n$, and corresponds to a single eccentric distance $U_n$ and time to during free bending. That is, at each time, there is a corresponding eccentric distance present to control the free bending forming of the complex component. For example, 6 control points are chosen in the custom complex axis. The bending radii $R_n$ of the 6 control points are determined according to the function $f(x)_2$ to be $R_1=260$ mm, $R_2=240$ mm, $R_3=220$ mm, $R_4=200$ mm, $R_5=180$ mm, and $R_6=160$ mm, respectively. An eccentric distance and a movement velocity of a bending die are calculated by analytic equations for the free bending forming process, whereby a movement locus is determined. The free bending die is then allowed to move along the planned locus to form the complex component having a custom continuous curve.

$$R_n = \frac{(1+f(x)'^2)^{\frac{3}{2}}}{|f(x)''|}$$

$$t_{sn} = \frac{\Delta S_n}{v},$$

$$t_{kn} = \frac{\pi \times R_n \times \arcsin\frac{A}{R_n}}{180° \times v},$$

$$U_n = R_n - R_n \cos\frac{vt_{kn} \times 180}{\pi \times R_n} + \tan\frac{vt_{kn} \times 180}{\pi \times R_n}\left(A - R_n \sin\frac{vt_{kn} \times 180}{\pi \times R_n}\right)$$

By calculation, the eccentric distances and times are obtained as follows: $t_{s1}=5$ s, $t_{k1}=3.007$ s, $U_1=1.88238105$ mm; $t_{s2}=5$ s, $t_{k2}=3.009$ s, $U_2=2.055052734$ mm; $t_{s3}=5$ s, $t_{k3}=3.011$ s, $U_3=2.262800196$ mm; $t_{s4}=5$ s, $t_{k4}=3.014$ s, $U_4=2.517601851$ mm; $t_{s5}=5$ s, $t_{k5}=3.018$ s, $U_5=2.837662091$ mm; and $t_{s6}=5$ s, $t_{k6}=3.023$ s, $U_6=3.252052344$ mm. The free bending forming of the custom axis $f(x)_2$ is controlled precisely based on the calculated real-time eccentric distances and times.

What is claimed is:

1. A method for precision forming by continuous free bending, comprising the following steps:
    (1) extracting a curved axis from a bent component, establishing a correlation equation of the continuous curved axis f(x) to a bending radius R, and determining a bending radius R at a real-time location in the curved axis;
    wherein the correlation equation of f(x) to a bending radius R in step (1) is expressed as:

$$R_n = \frac{(1+f(x)^2)^{\frac{3}{2}}}{|f(x)''|},$$

wherein n represents a point n in the curved axis, while $R_n$ a bending radius corresponding to the point n;
    (2) establishing a correlation model of a bending radius R to an eccentric distance U of a bending die to obtain correlations of f(x) to bending parameters; and
    (3) constructing a complete correlation model among f(x), R, U, and t based on a relational equation of an eccentric distance U to movement time t of the bending die; and
    (4) controlling the free bending based on the eccentric distance U and the movement time t, to enable the precision forming of the bent component by continuous free bending.

2. The method for precision forming by continuous free bending according to claim 1, wherein the f(x) is a parabolic axis function.

3. The method for precision forming by continuous free bending according to claim 1, wherein the correlation model of a bending radius R to an eccentric distance U of a bending die in step (2) is expressed as:

$$t_{sn} = \frac{\Delta S_n}{v},$$

-continued $$t_{kn} = \frac{\pi \times R_n \times \arcsin\frac{A}{R_n}}{180° \times v};$$

$$U_n = R_n - R_n\cos\frac{vt_{kn} \times 180}{\pi \times R_n} + \tan\frac{vt_{kn} \times 180}{\pi \times R_n}\left(A - R_n\sin\frac{vt_{kn} \times 180}{\pi \times R_n}\right),$$

wherein $U_n$ represents an eccentric distance corresponding to the point n, while A a distance from a front end of a guide mechanism to the center of the bending die, v an axial feed velocity of a tube, $t_{sn}$ a time taken for forming of an arc length $\Delta S_n$, and $t_{kn}$ a time taken for the bending die to reach an eccentric distance $U_n$.

4. The method for precision forming by continuous free bending according to claim 1, wherein n is 6.

5. The method for precision forming by continuous free bending according to claim 2, wherein the correlation model of a bending radius R to an eccentric distance U of a bending die in step (2) is expressed as:

$$t_{sn} = \frac{\Delta S_n}{v},$$

$$t_{kn} = \frac{\pi \times R_n \times \arcsin\frac{A}{R_n}}{180° \times v};$$

$$U_n = R_n - R_n \cos\frac{vt_{kn} \times 180}{\pi \times R_n} + \tan\frac{vt_{kn} \times 180}{\pi \times R_n}\left(A - R_n \sin\frac{vt_{kn} \times 180}{\pi \times R_n}\right),$$

wherein $U_n$ represents an eccentric distance corresponding to the point n, while A a distance from a front end of a guide mechanism to the center of the bending die, v an axial feed velocity of a tube, $t_{sn}$ a time taken for forming of an arc length $\Delta S_n$, and tin a time taken for the bending die to reach an eccentric distance $U_n$.

\* \* \* \* \*